United States Patent [19]

Cooper

[11] Patent Number: 4,525,279
[45] Date of Patent: Jun. 25, 1985

[54] DEWATERING OF MINERAL SLURRIES

[75] Inventor: Ian V. Cooper, Georgetown, Canada

[73] Assignee: Dow Corning Corporation, Midland, Mich.

[21] Appl. No.: 520,376

[22] Filed: Aug. 4, 1983

[51] Int. Cl.³ .............................................. C02F 1/56
[52] U.S. Cl. ..................................... 210/728; 210/735
[58] Field of Search ............... 210/710, 711, 725, 727, 210/728, 735, 736; 209/5, 166, 167; 252/60, 61, 180, 181

[56] References Cited

U.S. PATENT DOCUMENTS

| 3,285,849 | 11/1966 | Watanabe | 210/728 |
| 3,398,104 | 8/1968 | Haluska | 260/2.5 |
| 3,402,192 | 9/1968 | Haluska | 260/448.2 |
| 4,067,806 | 1/1978 | Mauceri | 210/728 |
| 4,207,186 | 6/1980 | Wang et al. | 210/54 |
| 4,210,531 | 7/1980 | Wang et al. | 210/51 |
| 4,231,868 | 11/1980 | Wang et al. | 210/728 |
| 4,290,896 | 9/1981 | Gordon et al. | 210/710 |
| 4,290,897 | 9/1981 | Swihart | 210/728 |
| 4,374,734 | 2/1983 | Newcombe | 210/728 |

*Primary Examiner*—Ernest G. Therkorn
*Attorney, Agent, or Firm*—Richard A. Kaba

[57] ABSTRACT

Mineral slurries are effectively dewatered by a process employing a water-soluble or water dispersible silicone glycol as a dewatering aid. The process provides for mixing the dewatering aid with the aqueous mineral slurry and thereafter separating the treated slurry into a mineral portion and an aqueous portion. The use of the silicone glycol provides for reduced moisture content and/or increased production rate in a mineral slurry dewatering process.

22 Claims, No Drawings

DEWATERING OF MINERAL SLURRIES

BACKGROUND OF THE INVENTION

This invention relates to a process for dewatering certain mineral slurries. More specifically, this invention relates to a process for dewatering aqueous slurries of aluminum ore, copper ore, iron ore, lead ore, molybdenum ore, and zinc ore by the use of a silicone glycol as a dewatering aid.

Valuable components of numerous minerals are concentrated by various procedures to provide mineral concentrates that are further processed. One of the most widely used methods of concentration is froth flotation which is applicable to a wide variety of minerals. After a mineral has been sufficiently enriched in valuable component by concentrating, it is usually subjected to dewatering so that it may be shipped more economically and/or further processed more readily. In dewatering, the mineral concentrate in slurry form is subjected to filtration or equivalent processing to remove water therefrom. The removal of water decreases the weight of the concentrate and also reduces the energy requirements for subsequent evaporation of residual water when necessary such as for smelting.

Both surfactants and flocculating agents have been employed to assist the dewatering of mineral slurries. For example, U.S. Pat. No. 4,207,186 (issued June 10, 1980) discloses that a mixture of a hydrophobic alcohol and a nonionic surfactant can be employed as a dewatering aid for mineral slurries. U.S. Pat. No. 4,210,531 (issued July 1, 1980) teaches the use of a combination of a flocculant, an anionic surface active agent, and a water insoluble organic liquid for mineral slurry dewatering. U.S. Pat. No. 4,231,868 (issued Nov. 4, 1980) teaches the use of N-substituted sulfosuccinanate as dewatering aids with mineral slurries. None of the above cited patents teach the use of any organopolysiloxanes as mineral slurry dewatering aids.

U.S. Pat. No. 4,290,896 (issued Sept. 22, 1981) discloses that a wide variety of organopolysiloxanes can be employed as dewatering aids for fine coal. The use of organopolysiloxanes as dewatering aids in the processing of mineral slurries was not taught nor disclosed in this patent. Indeed, U.S. Pat. No. 4,290,896 does not even allude to such a use. The organopolysiloxanes of U.S. Pat. No. 4,290,896 were described by the general formula $$R_aH_bSiO_{(4-a-b)/2}$$

where (a+b) varies from greater than zero to less than 4, b varies from 0 to a, and R is an organic radical bonded to a silicon atom by a silicon-carbon bond. R in the above formula denotes any organic radical, such as any hydrocarbon radical such as any alkyl, alkenyl, alkynyl, cycloaliphatic, aryl or arylalkyl radical, or any substituted hydrocarbon radical wherein said substituents include halogen, hydroxy, alkoxy, aryloxy, carboxy, carbalkoxy, amino, substituted amino, polyalkyleneoxy, mercapto, substituted mercapto, polyalkyleneimine, amide, nitro, and the like.

As is well known in the art, coal and mineral slurries are very different indeed. Coal slurries consist essentially of organic molecules whereas the mineral slurries consist essentially of inorganic molecules. Therefore, it is surprising that I have found that certain of the same organopolysiloxanes useful in the dewatering of fine coal are effective in the dewatering of minerals.

In spite of the effectiveness of dewatering aids which have been employed with mineral slurries, there nevertheless still exists the need for improved dewatering aids which provide lower residual water in the separated concentrate and/or more efficient separation of the mineral concentrate and which results in advantages thereby. Considering annual processing of many millions of tons of mineral ores, such advantages could provide substantial saving in shipping, processing, and capital costs. The provision for improved dewatering aids, therefore, would fulfill a long-felt need and constitute a significant advance in the art.

Therefore an object of this invention is to provide an improved dewatering aid for mineral slurries. Another object of this invention is to provide an improved dewatering aid for mineral slurries containing aluminum, copper, iron, lead molybdenum, or zinc ores.

THE INVENTION

This invention relates to a process for dewatering an aqueous slurry of a mineral said process comprising (1) mixing said aqueous slurry with a dewatering-improving amount of a water-soluble or water-dispersible silicone glycol of the general formula $$G_aR_{(3-a)}SiO[R_2SiO]_n[RGSiO]_mSiR_{(3-a')}G_{a'}$$

wherein G is a radical attached to Si through a Si-C bond and G is of general formula $$-D(OC_2H_4)_x(OC_3H_6)_yB$$

wherein:
D is an alkylene radical containing from 2 to 18 carbon atoms inclusive;
x equals 1 to 20 inclusive;
y equals 0 to 5 inclusive;
the ratio of x to y is at least 2 to 1; and B is a capping group selected from the group consisting of —OR', $$-O\overset{O}{\underset{\|}{C}}R' \text{ and } -O\overset{O}{\underset{\|}{C}}OR' \text{ to}$$

where R' is a hydrogen atom or a hydrocarbon radical containing from 1 to 10 carbon atoms; and wherein:
a is 0 or 1; a' is 0 or 1;
R is a methyl or ethyl radical;
n is 0 to 25 inclusive;
m is 0 to 12 inclusive; and
(a+a'+m) is greater than or equal to 1;
and
(II) thereafter separating the mixture formed in step (I) into an aqueous portion and a mineral portion.

Many different minerals may be treated by the process of this invention so long as an improvement in the dewatering process, as defined herein, is obtained. Mineral slurries containing aluminum ore, copper ore, iron ore, lead ore, molybdenum ore, and zinc ore are preferred for processing using the dewatering aid of this invention. These mineral slurries or concentrates may contain sulfides or oxides as well as other mineral ores.

The silicone glycol dewatering aids of this invention must be water-soluble or water-dispersible. These silicone glycols are described by the general formula $$G_aR_{(3-a)}SiO[R_2SiO]_n[RGSiO]_mSiR_{(3-a')}G_{a'}.$$

In the silicone glycol the number of [R₂SiO] units is defined by n which has a value of 0 to 25 inclusive, but preferably has a value of 0 to 5 inclusive. The number of siloxane units containing glycol groups is defined by the sum (m+a+a'), where m has a value of 0 to 12 inclusive and preferably a value of 1 to 5 inclusive, where both a and a' are independently equal to 0 or 1 and where the sum (m+a+a') is greater than or equal to 1. It is preferred that both a and a' are equal to zero in which case m has a value of 1 to 12 inclusive and the silicone glycol may be represented by the general formula $$R_3SiO[R_2SiO]_n[RGSiO]_mSiR_3.$$

R in the above formulae is either a methyl or ethyl radical with methyl being the preferred species.

The glycol portion of the silicone glycol is defined by the symbol G which is attached to silicon through a silicon-carbon bond. The glycol G may be represented by the general formula $$-D(OC_2H_4)_x(OC_3H_6)_yB$$

In this structure D can be any alkylene radical containing from 2 to 18 carbon atoms. Thus D can be, for example, an ethylene, propylene, isopropylene, butylene, isobutylene, hexylene, octylene, decylene, dodecylene, hexadecylene or an octadecylene radical. It is preferred that D be an akylene radical containing from 2 to 6 carbon atoms.

The glycol portion of the silicon glycol may contain both ethylene oxide units, (OC₂H₄), or propylene oxide units, (OC₃H₆). The number of ethylene oxide units present is defined by x which may vary from 1 to 20 inclusive. It is preferred that x range from 5 to 10 inclusive and most preferable from 6 to 8 inclusive. The number of propylene oxide units present is defined by y which may vary from 0 to 5 inclusive. It is preferred however that the glycol portion contains only ethylene oxide units (y equals 0). When both ethylene oxide and propylene oxide units are present the ratio of x to y must be at least 2 to 1.

The final portion of the glycol is B which is a capping group selected from the group consisting of the —OR', $$-O\overset{O}{\underset{\|}{C}}R' \text{ and } -O\overset{O}{\underset{\|}{C}}OR' \text{ to}$$

radicals wherein R' is a hydrogen atom or a hydrocarbon radical free of aliphatic unsaturation which contains from 1 to 10 carbon atoms. By way of illustration, the glycol can be hydroxy, ether, carboxyl, acyloxy, carbonate or ester capped. Specific examples of R', in addition to the hydrogen atom, include the methyl, ethyl, propyl, butyl, isopropyl, cyclohexyl, phenyl, tolyl, benzyl, and decyl radicals. Preferable the capping group is —OH where R' is hydrogen.

It should be understood that the above formulae represent the average molecular configuration for the silicone glycols of this invention. Mixtures of various silicone glycols may be used as mineral dewatering aids. Furthermore, the silicon atoms to which the glycol units G are attached need not be evenly spaced along the main siloxane chain.

The silicone glycols useful in this invention and the various methods of their preparation are well known. Some of the silicone glycols are commercially available. For those wanting more detailed information on these materials and their preparation, attention is directed to U.S. Pat. Nos. 3,398,104 (issued Aug. 20, 1968) and 3,402,192 (issued Sept. 17, 1968) which are hereby incorporated by reference.

In carrying out the present invention, an aqueous mineral slurry is treated with a dewatering-improving amount of the described dewatering aid. By "dewatering-improving amount" it is meant that the dewatering aid is added in amount sufficient to yield improvements in the dewatering process. Such improvements can include a reduction in the water content of the dewatered mineral ore, faster through-put or rate of separation in the dewatering process, faster drying time for the mineral ore, or decreased energy usage as well as other improvements. The dewatering-improving amount of the dewatering aid will generally vary depending on such factors as the specific mineral ore to be dewatered, the specific silicone glycol used, and the like. The amount required is best determined by a few routine experimental tests. Generally, however, the silicone glycol should be employed at a level greater than or equal to 0.05 parts by weight of the silicone glycol per every 1000 parts by weight of the mineral ore in the aqueous slurry.

The silicone glycol dewatering aid or a mixture of silicone glycol dewatering aids may be added in an undiluted form or in an aqueous medium. It is preferred that the dewatering aid be dissolved or dispersed in water prior to mixing with the mineral slurry in order to provide more even distribution of the dewatering aid in the mineral slurry.

A highly ionic species may also be used in combination with the silicone glycol dewatering aid of this invention to further improve the dewatering characteristics of the dewatering aid. Examples of such highly ionic species include sodium chloride, cupric sulfate, and ferric chloride. These ionic species will normally be present at levels of 0 to about 10 g of the ionic species per 1000 g of the mineral solids.

After treatment of the mineral slurry with a dewatering-improving amount of the silicone glycol the aqueous slurry is separated into an aqueous portion and a mineral portion by appropriate means. Such separating means include, for example, vacuum filtration, pressure filtration, gravity filtration, solid-bowl centrifugation, screen-bowl centrifugation and suitable combinations of the various separating means.

The following examples further describe and teach the process of this invention and are not intended to limit the invention.

EXAMPLE 1

A silicone glycol was prepared by reacting a SiH containing silicone with an allyloxypolyethylene oxide in the presence of a platinum catalyst. The allylpolyethylene oxide had an average formula of CH₂=CHCH₂O(CH₂CH₂O)₇H and was obtained from Olin Corporation, Stamford, Conn. under the tradename Poly-G WS400AA. The allylpolyethylene oxide (57.6 parts by weight) and 0.1 parts by weight sodium acetate were placed in a flask and degassed, with agitation, at 25 mm mercury for 15 minutes. The vacuum was broken with $N_2$ gas which was also used to sweep the reaction flask throughout the reaction. A SiH containing silicone of average formula $(CH_3)_3SiO[(CH_3)_2SiO][(CH_3)HSiO]Si(CH_3)_3$ (10.6 parts by weight) and 5 ppm chloroplatinic acid (about 5 ppm platinum) was then added. The temperature was increased to 100° C. and an additional 31.8 parts by weight of the same SiH containing silicone was added. During this addition the temperature was kept below about 120° C. The temperature of the reaction mixture was kept at about 120°–125° C. for two hours. The reaction mixture was tested with an alcoholic $AgNO_3$ solution to insure that all SiH had reacted. The mixture was stripped at 150°–160° C. under vacuum (25 mm mercury) for one hour. After filtering a product with an average formula of $(CH_3)_3SiO[(CH_3)_2SiO][(CH_3)GSiO]Si(CH_3)_3$ where G is $-CH_2CH_2CH_2O(CH_2CH_2O)_7H$ was obtained. This silicone glycol is hereafter referred to as silicone glycol I.

An aluminum ore containing alumina trihydrate was employed to evaluate the above described silicone glycol as a dewatering aid. The aqueous aluminum ore slurry was from Alcan International, Kingston, Ontario, Canada and contained about 60 percent by weight solids. Various amounts of the silicone glycol were mixed with the aluminum ore slurry. The samples were filtered about 10 minutes after addition of the dewatering aid. Separation was carried out by a vacuum filtration procedure using the "top feed" method. The samples were filtered using a laboratory disc filter from Emco Process Equipment Co., Salt Lake City, Utah using a polyester filter medium. The filter area was about 0.1 square feet and the vacuum was about 20 inches of mercury. A 100 ml aliquot of the silicone glycol treated slurry was filtered. After completion of the filtration, air is drawn through the filter cake for 40 seconds (the "dry time"). The filter cake was then analyzed by drying the cake at 110° C. to a constant weight. The following results were obtained. Unless noted otherwise, all results are an average of at least two runs.

| SILICONE LEVEL (g/kg) | WEIGHT (g) OF CAKE Wet | WEIGHT (g) OF CAKE Dry | PERCENT MOISTURE |
| --- | --- | --- | --- |
| 0 | 92.6 | 77.7 | 16.1 |
| 0.05 | 100.2 | 87.6 | 12.6 |
| 0.25 | 94.2 | 85.6 | 9.1 |
| 0.50 | 96.2 | 90.2 | 6.2 |

It can be easily seen that the silicone glycol at levels as low as 0.05 g silicone glycol per 1000 g of aluminum ore solids acts as an effective dewatering aid.

EXAMPLE 2

This example shows the use of a silicone glycol dewatering aid with a copper ore concentrate. The same silicone glycol I and experimental procedures as described in Example 1 were used here except as noted. The copper ore slurry was from Kidd Creek Mines, Timmins, Ontario, Canada and contained 62.5 percent solids by weight. A drying time of 168 seconds was employed. The filter medium was canvas duckcloth.

| SILICONE LEVEL (g/kg) | PERCENT MOISTURE |
| --- | --- |
| 0 | 15.8 |
| 0.1 | 16.0 |
| 0.25 | 15.7 |
| 0.50 | 15.9 |
| 1.0 | 11.5 |
| 2.0 | 9.6 |

Significant improvements in the dewatering characteristics of the copper ore slurry are noted when the dewatering aid is present at levels greater than 0.5 g silicone glycol per 1000 g copper ore solids.

EXAMPLE 3

A slightly different silicone glycol dewatering aid was employed in this example. The silicone glycol was prepared in exactly the same manner using the same starting materials as described in Example 1. The difference lies in the formulation. The present silicone glycol was prepared from 51.7 parts by weight of the allyloxypolyethylene oxide, 48.2 parts by weight of the SiH containing silicone, 0.1 parts by weight of sodium acetate, and 5 parts by weight chloroplatinic acid.

The same copper slurry described in Example 2 was employed to test the effectiveness of the dewatering aid. Samples were filtered about ten minutes after the addition of the filter aid. The filtering apparatus was modified to allow for bottom feeding of the aqueous slurry. The filter was plunged directly into the copper slurry so that the slurry is drawn up through the filter and the solids are collected onto the filter medium. The filter was immersed in the slurry for 84 seconds (the formation time). After removal of the filter from the slurry, air was drawn through the filter for 168 seconds (the dry time). The filtration was carried out at a vacuum of 20 inches of mercury using a canvas duckcloth filter medium.

The silicone glycol dewatering aid was evaluated in both the presence and absence of sodium chloride.

| SILICONE LEVEL (g/kg) | NaCl LEVEL (g/kg) | DRY CAKE PRODUCTION (kg/hr. ft$^2$) | PERCENT MOISTURE |
| --- | --- | --- | --- |
| 0 | 0 | 70.3 | 15.9 |
| 0.1 | 0 | 71.5 | 15.9 |
| 0.1 | 1.0 | 80.9 | 15.7 |
| 0.25 | 0 | 77.7 | 15.5 |
| 0.25 | 1.0 | 84.6 | 15.3 |
| 0.50 | 0 | 69.2 | 13.0 |
| 0.50 | 1.0 | 68.9 | 12.2 |

Significant improvement in moisture content is noted at levels of about 0.5 g silicone glycol per 1000 g solids. An improvement in the dry cake production is noted at lower levels of the silicone glycol.

EXAMPLE 4

The silicone glycol of Example 3 was used as a dewatering aid with a iron ore slurry containing 45 percent solids from Sherman Mines, Temagami, Ontario, Canada. The top feed method of filtration was used. For some runs various levels of sodium chloride were also added along with the silicone glycol dewatering aid.

| SILICONE LEVEL (g/kg) | NaCl (g/kg) | PERCENT MOISTURE |
| --- | --- | --- |
| 0 | 0 | 12.0 |
| 0 | 1.0 | 12.3 |
| 0 | 10.0 | 12.5 |
| 0.25 | 0 | 12.1 |
| 0.25 | 1.0 | 11.6 |
| 0.25 | 10.0 | 11.4 |
| 0.5 | 0 | 10.3 |
| 0.5 | 1.0 | 10.1 |
| 0.5 | 10.0 | 10.0 |
| 1.0 | 0 | 9.1 |

The silicone glycol alone is an effective dewatering aid at levels of 0.5 g and greater of silicone glycol per 1000 g of iron ore solids. With sodium chloride present the silicone glycol is effective at even lower levels.

EXAMPLE 5

A lead ore slurry (81 percent solids) from Cominco Mines, Kimberly, British Columbia, Canada was used to evaluate several silicone glycol dewatering aids. The top feed methods of filtration with a drying time of 168 seconds was used. A canvas duckcloth filtering medium was employed. Silicone I is the same as the silicone glycol described in Example 3. Silicone II is of general formula $(CH_3)_3SiO[(CH_3)_2SiO][(CH_3)GSiO]Si(CH_3)_3$ where G is $-(CH_2)_3O(CH_2CH_2O)_{12}H$. Silicone II was prepared from 33.4 parts by weight $(CH_3)_3SiO[(CH_3)_2SiO][(CH_3)HSiO]SiMe_3$, 66.6 parts by weight $CH_2=CHCH_2O(CH_2CH_2O)_{12}H$, 0.02 parts by weight sodium acetate, and 12.5 ppm chloroplatinic acid using the same basic procedure described in Example 1. The polyglycol was obtain from Dow Chemical Company, Midland, Mich. under the tradename AE-510. Silicone III is of general formula $(CH_3)_3SiO[(CH_3)GSiO]Si(CH_3)_3$ where G is $-(CH_2)_3(CH_2CH_2O)_7H$. Silicone III was prepared, using the same general procedure from Example 1, from 31.2 parts by weight $(CH_3)_3SiO[(CH_3)HSiO]Si(CH_3)_3$, 68.7 parts by weight $CH_2=CHCH_2O(CH_2CH_2O)_7H$, 0.09 parts by weight sodium acetate, and 12.5 ppm chloroplatinic acid. The polyglycol was the same material as used in Example 1.

| SILICONE | SILICONE LEVEL (g/kg) | PERCENT MOISTURE |
| --- | --- | --- |
| None | 0 | 10.8 |
| I | 0.05 | 10.7 |
| I | 0.10 | 10.6 |
| I | 0.25 | 8.0 |
| I | 0.50 | 5.7 |
| II | 0.05 | 10.2 |
| II | 0.10 | 9.8 |
| II | 0.25 | 6.9 |
| II | 0.50 | 6.2 |
| III | 0.05 | 10.3 |
| III | 0.10 | 8.2 |
| III | 0.25 | 6.1 |
| III | 0.50 | 5.8 |

Both silicones II and III show moisture reduction at levels as low as 0.05 g silicone glycol per 1000 g lead ore solids. Silicone I gives moisture reduction when used at higher dosage rates.

EXAMPLE 6

A silicone glycol of average formula $(CH_3)_3SiO[(CH_3)_2SiO]_9[(CH_3)GSiO]_4Si(CH_3)_3$ where G is $-CH_2CH_2CH_2O(CH_2CH_2O)_7H$ was used as a dewatering aid with molybdenum ore (18.5% solids) from Gilbralter Mines, McLeese Lake, British Columbia, Canada. The silicone glycol was prepared by the general procedure as outlined in Example 1 by reacting 61.6 parts by weight $(CH_3)_3SiO[(CH_3)_2SiO]_9[(CH_3)HSiO]_4Si(CH_3)_3$, 38.4 parts by weight of the polyglycol of Example 1, 0.02 parts by weight of sodium acetate, and 12.5 ppm chloroplatinic acid. The top feed filtration method with a dry time of 80 seconds and a vacuum of 20 inches of mercury was used. The filter medium was canvas duckcloth. A sample of dewatered molybdenum ore without any added dewatering aid had a moisture content of 14.8 percent after filtration. When the silicone glycol dewatering aid was added at a level of 1 g silicone glycol per 1000 g of solids the moisture content dropped to 9.8 percent.

EXAMPLE 7

A zinc ore slurry was dewatered using the same silicone glycol dewatering aid as described in Example 1. The zinc ore slurry contained 61 percent solids and was from Brunswick Mining and Smelting, Bathurst, New Brunswick, Canada. The top feed filtration method was employed with a dry time of 80 seconds and a vacuum of 20 inches of mercury. A canvas duckcloth filter medium was employed. Without any dewatering aid the filtered zinc ore solids had a moisture content of 15.2 percent. The moisture content dropped to 12.7 percent when the silicone glycol dewatering aid was added to the slurry at a level of 1 g silicone glycol per 1000 g of slurry solids.

That which is claimed is:

1. A process for dewatering an aqueous slurry of a mineral, said process comprising
 (I) mixing said aqueous slurry with a dewatering-improving amount of a water-soluble or water-dispersible silicone glycol of the general formula $G_aR_{(3-a)}SiO[R_2SiO]_n[RGSiO]_mSiR_{(3-a')}G_{a'}$ wherein G is a radical attached to Si through a Si—C bond and G is of general formula $-D(OC_2H_4)_x(OC_3H_6)_yB$ wherein:
 D is an alkylene radical containing from 2 to 18 carbon atoms inclusive;
 x equals 1 to 20 inclusive;
 y equals 0 to 5 inclusive;
 the ratio of x to y is at least 2 to 1; and B is a capping group selected from the group consisting of —OR', $$-OCR' \text{ and } -OCOR' \text{ to}$$

where R' is a hydrogen atom or a hydrocarbon radical containing from 1 to 10 carbon atoms; and wherein:

a is 0 or 1; a' is 0 or 1;
R is a methyl or ethyl radical;
n is 0 to 25 inclusive;
m is 0 to 12 inclusive; and
(a+a'+m) is greater than or equal to 1;
and (II) thereafter separating the mixture formed in step (I) into an aqueous portion and a mineral portion.

2. A process as defined in claim 1 wherein a equals 0; a' equals 0; R is a methyl radical; and y equals zero.

3. A process as defined in claim 2 wherein said mineral is selected from the group consisting of aluminum ore, copper ore, iron ore, lead ore, molybdenum ore, and zinc ore.

4. A process as defined in claim 3 where n is 0 to 5 inclusive; m is 1 to 5 inclusive, D contains 2 to 6 carbon atoms inclusive and x is 5 to 10 inclusive.

5. A process as defined in claim 3 wherein said separating step consists of vacuum filtration.

6. A process as defined in claim 2 where n is 0 to 5 inclusive; m is 1 to 5 inclusive, D contains 2 to 6 carbon atoms inclusive and x is 5 to 10 inclusive.

7. A process as defined in claim 6 wherein said mineral is aluminum ore.

8. A process as defined in claim 6 wherein said mineral is aluminum ore.

9. A process as defined in claim 6 wherein said mineral is iron ore.

10. A process as defined in claim 6 wherein said mineral is lead ore.

11. A process as defined in claim 6 wherein said mineral is molybdenum ore.

12. A process as defined in claim 6 wherein said mineral is zinc ore.

13. A process as defined in claim 1 wherein said mineral is selected from the group consisting of aluminum ore, copper ore, iron ore, lead ore, molybdenum ore, and zinc ore.

14. A process as defined in claim 13 where n is 0 to 5 inclusive; m is 1 to 5 inclusive, D contains 2 to 6 carbon atoms inclusive and x is 5 to 10 inclusive.

15. A process as defined in claim 13 wherein said separating step consists of vacuum filtration.

16. A process as defined in claim 1 where n is 0 to 5 inclusive; m is 1 to 5 inclusive, D contains 2 to 6 carbon atoms inclusive and x is 5 to 10 inclusive.

17. A process for dewatering an aqueous slurry of a mineral, said process comprising (I) mixing said aqueous slurry with a dewatering-improving amount of a water-soluble or water-dispersible silicone glycol of general formula $$(CH_3)_3SiO[(CH_3)_2SiO]_n[CH_3(G)SiO]_mSi(CH_3)_3$$

wherein G is a radical attached to Si through a Si—C bond and of the general formula $$-D(OC_2H_4)_xOH$$

wherein:
D is an alkylene radical containing from 2 to 4 carbon atoms inclusive and x equals 6–8 inclusive; and wherein n is 0 to 5 inclusive and m is 1 to 5 inclusive; and (II) thereafter separating the mixture formed in step (I) into an aqueous portion and a mineral portion.

18. A process as defined in claim 17 wherein said mineral is selected from the group consisting of aluminum ore, copper ore, iron ore, lead ore, molybdenum ore, and zinc ore.

19. A process as defined in claim 18 wherein said separating step consists of vacuum filtration.

20. A process as defined in claim 18 wherein there is also present a highly ionic species selected from the group consisting of sodium chloride, cupric chloride, and ferric chloride.

21. A process as defined in claim 17 wherein said separating step consists of vacuum filtration.

22. A process as defined in claim 17 wherein there is also present a highly ionic species selected from the group consisting of sodium chloride, cupric chloride, and ferric chloride.

* * * * *

UNITED STATES PATENT AND TRADEMARK OFFICE
CERTIFICATE OF CORRECTION

PATENT NO. : 4,525,279
DATED : June 25, 1985
INVENTOR(S) : Ian V. Cooper

It is certified that error appears in the above-identified patent and that said Letters Patent is hereby corrected as shown below:

Column 2, line 48, delete the word "to" after the formula.
Column 3, line 4, delete ")" at the end of the formula.
Column 3, line 53, delete the word "to" after the formula.
Column 7, line 37, the word "obtain" should read --obtained--
Column 8, line 64, delete the word "to" after the formula.

Signed and Sealed this

Twenty-fourth Day of February, 1987

Attest:

DONALD J. QUIGG

Attesting Officer     Commissioner of Patents and Trademarks